United States Patent
Vahle et al.

(10) Patent No.: US 12,214,400 B2
(45) Date of Patent: Feb. 4, 2025

(54) METHOD OF FORMING A SPLINED COMPONENT

(71) Applicant: Magna Powertrain Inc., Concord (CA)

(72) Inventors: Harold Vahle, Concord (CA); Saso Cekalov, Concord (CA)

(73) Assignee: Magna Powertrain Inc., Concord, CA (US)

( * ) Notice: Subject to any disclaimer, the term of this patent is extended or adjusted under 35 U.S.C. 154(b) by 144 days.

(21) Appl. No.: 17/789,814

(22) PCT Filed: Feb. 17, 2021

(86) PCT No.: PCT/CA2021/050170
§ 371 (c)(1),
(2) Date: Jun. 29, 2022

(87) PCT Pub. No.: WO2021/163792
PCT Pub. Date: Aug. 26, 2021

(65) Prior Publication Data
US 2023/0039866 A1  Feb. 9, 2023

Related U.S. Application Data

(60) Provisional application No. 62/978,096, filed on Feb. 18, 2020.

(51) Int. Cl.
*B21D 22/28* (2006.01)
*B21D 53/28* (2006.01)
(Continued)

(52) U.S. Cl.
CPC .............. *B21D 22/28* (2013.01); *B21D 53/28* (2013.01); *B21D 53/84* (2013.01); *B21K 1/30* (2013.01);
(Continued)

(58) Field of Classification Search
CPC ...... B21D 22/28; B21D 24/005; B21D 22/30; B21D 53/28; B21D 22/84; B21K 1/30;
(Continued)

(56) References Cited

U.S. PATENT DOCUMENTS 4,397,171 A   8/1983   Suh et al.
4,705,150 A   11/1987  Hill
(Continued)

FOREIGN PATENT DOCUMENTS

| CA | 2482955 | 12/2003 |
|---|---|---|
| EP | 1350866 A1 | 10/2003 |
| EP | 1322436 B1 | 6/2004 |
| JP | 2007160333 A | 6/2007 |
| JP | 2016101599 A1 | 6/2016 |
| KR | 20170108486 A * | 9/2017 |

*Primary Examiner* — Jared O Brown
(74) *Attorney, Agent, or Firm* — Dickinson Wright PLLC

(57) ABSTRACT

A method of manufacturing a torque-transmitting component includes providing a flat blank to a transfer press having a plurality of stations and performing a plurality of pressing operations, in which the flat blank is formed into a cup shape, rough splines are formed on the cup shape, and the rough splines are further pressed to define smooth splines. The component includes a continuous smooth inner diameter defined by a punch of the transfer press and a plurality of smooth splines defined by a die of the transfer press. The minor diameter of the splines is not machined to form the splines.

11 Claims, 13 Drawing Sheets

(51) Int. Cl.
  *B21D 53/84*   (2006.01)
  *B21K 1/30*    (2006.01)
  *B23P 15/14*   (2006.01)
  *F16D 13/68*   (2006.01)
  *B21D 22/30*   (2006.01)

(52) U.S. Cl.
  CPC ............ *B23P 15/14* (2013.01); *F16D 13/683* (2013.01); *B21D 22/30* (2013.01)

(58) Field of Classification Search
  CPC ............ B21K 1/305; B21J 5/12; B23P 15/14; F16D 2250/0023; F16H 55/17
  See application file for complete search history.

(56) References Cited

U.S. PATENT DOCUMENTS

| | | | |
|---|---|---|---|
| 5,310,432 A * | 5/1994 | Fukui | B21D 53/28 29/893.32 |
| 6,233,999 B1 * | 5/2001 | Yabutani | B21D 53/28 72/354.8 |
| 6,694,791 B1 | 2/2004 | Johnson et al. | |
| 8,833,124 B2 | 9/2014 | Cripsey et al. | |
| 8,997,354 B2 | 4/2015 | Iwata et al. | |
| 9,020,196 B2 | 4/2015 | Takahashi | |
| 9,121,456 B2 | 9/2015 | Luipold et al. | |
| 10,047,806 B2 | 8/2018 | Hodge | |
| 11,536,321 B2 * | 12/2022 | Matsumoto | B21D 53/28 |
| 2017/0074331 A1 * | 3/2017 | Fisher | F16D 13/683 |

* cited by examiner

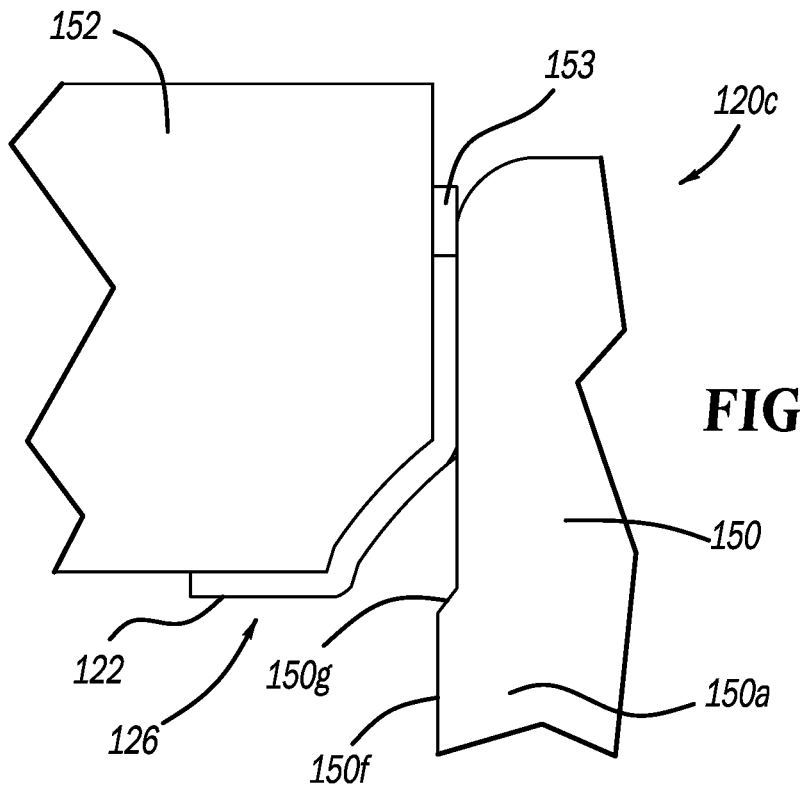
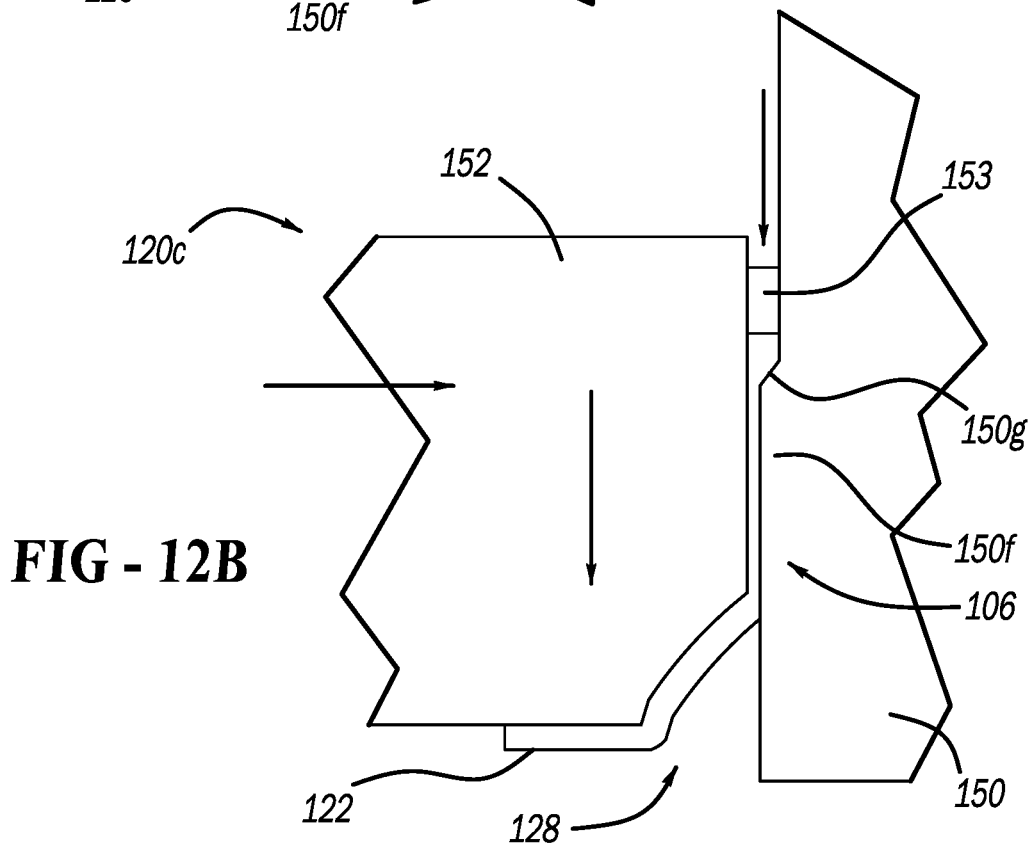

METHOD OF FORMING A SPLINED COMPONENT

CROSS-REFERENCE TO RELATED APPLICATIONS

This application is a U.S. National Stage of PCT International Patent Application No. PCT/CA2021/050170, filed on Feb. 17, 2021, which claims the benefit of previously filed U.S. Provisional Patent Application No. 62/978,096, filed Feb. 18, 2020, the entire content of which is hereby incorporated by reference in its entirety.

FIELD

The present disclosure relates generally to a new method of manufacturing splined components and splined components manufactured in accordance with this new method. More particularly, the present disclosure relates to components manufactured using draw forming and other pressing operations all of which are capable of being sequentially provided in a transfer press unit.

BACKGROUND

This section provides background information related to the present disclosure which is not necessarily prior art.

Power transfer devices of the type used in automotive applications, such as for example, automatic transmissions, torque couplings, power take-off units and transfer cases, are commonly equipped with a power-operated multi-plate clutch assembly. Typically, the multi-plate clutch assembly includes a first clutch number (such as a clutch hub) driven by an input component, a second clutch member (such as a clutch drum) driving an output component, a multi-plate clutch pack disposed therebetween, and a powered clutch actuator for engaging the clutch pack and transmitting drive torque from the clutch hub to the clutch drum. The clutch drum and clutch hub are typically annular components having torque-transmitting spline teeth that are configured to engage and mesh with corresponding clutch teeth formed on the clutch plates of the clutch pack.

To reduce the mass of such clutch members while maintaining the required high-strength and torque transmission characteristics, many modern clutch hubs and drums, hereinafter referred to cumulatively as annular clutch components, are formed from sheet-metal blanks using a combination of various metal-forming and metal-cutting processes. Non-limiting examples of current high volume processes for manufacturing annular clutch components include Grob spline processing and flow form processing.

Due to the design of these formed sheet-metal clutch components, the currently available processes also present several known shortcomings. Specifically, the annular clutch components are initially formed from a steel blank that is drawn into a cup-shaped component having a radial plate segment and an axially-extending hub segment. The cup-shaped component is subsequently formed over a mandrel to produce a spline form in the hub segment via the Grob splining process. The start of the spline form from the flat flange segment to the outer diameter is in the form of a radius with a large radius on the major OD and a smaller radius on the minor OD. Typically, the annular clutch component requires an additional metal-cutting or machining process after forming the splines to form a mounting segment on the plate segment configured to allow subsequent welding or joining of another torque transmitting component. In order to guarantee the flatness of the plate segment of the annular clutch component, a metal-cutting machining process is also typically required. However, machining of the plate segment requires the cutter tool to cut along the entire length of the plate segment and encounter the edge of the spline form on both the major and minor OD surfaces. This "cut" edge profile results in an interrupted cut which, in turn, causes the machined edge material to be pushed down into the spline form as a burr. As such, a subsequent deburring operation is required to remove the burrs in the spline form area. Burrs that are not removed prior to assembly of the clutch assembly can have a detrimental impact on the function and service life of the clutch assembly.

One method of forming external splines is a broaching process. In the broaching process, material is removed from the outer surface of the component to define the external splined surface. However, this process may result in a poor surface finish on the minor diameter of the external spline, as well as on the flanks of the external spline. The resulting poor surface finish can prevent smooth sliding motion of a friction plate that is in contact with the spline surfaces. Additionally, the broaching process can have high cycle times, such as 20-30 seconds, as well as a high manufacturing cost.

Another method forming external splines is a one-shot forming process. In a one-shot process, the material of the spline is formed, and can provide an improved surface finish relative to the broaching process. However, the surface finish is still not as smooth as typically desired. The cycle time of such forming can be about 15-20 seconds, and includes a high manufacturing cost.

A further method of forming splines uses a cam die or roller die. The cycle time for such process can be as low as 4 seconds, and can have a relatively low cost relative to the broaching or one shot processes. Similar to the one shot process, this process is a material forming process, rather than a material removal process like broaching. However, in this approach, the internal diameter of the part is not continuous. Rather, the sidewall of the part has a generally constant thickness, with major and minor outer diameters as well as major and minor inner diameters defined by the process.

To this end, a need exists to develop a metal forming process capable of forming an annular clutch component which is an advancement over conventional cold forming (Grob spline forming) processes.

SUMMARY

This section provides a general summary of the present disclosure, and is not intended to be interpreted as a comprehensive listing of all of its aspects, features, advantages and objectives.

It is an aspect of the present disclosure to provide a method of manufacturing a high strength torque-transmitting component.

It is another aspect of the present disclosure to provide a method of manufacturing a high strength torque-transmitting component having a high-quality surface finish.

It is another aspect of the present disclosure to provide a method of manufacturing a high strength torque-transmitting component having a continuous internal diameter.

It is another aspect of the present disclosure to provide a method of manufacturing a high strength torque-transmitting component using a short-cycle time a low manufacturing cost.

According to these and other aspects of the disclosure, a splined annular component is provided, comprising: a radial flange segment; an axially-extending hub segment integrally formed with the radial flange segment; a plurality of splines formed on a radially outer surface of the hub segment, wherein the splines include a major outer diameter and a minor outer diameter; and a continuous inner diameter formed on a radially inner surface of the hub segment; wherein the minor outer diameter is smooth and formed without machining; wherein the inner diameter is smooth and formed without machining.

In one aspect, the hub portion has a radial thickness that varies around a circumference thereof, wherein a first radial thickness measured between the inner diameter and the minor diameter is less than a second radial thickness measured between the inner diameter and the outer diameter.

In one aspect, the component includes a chamfer portion disposed at an intersection of the flange segment and the hub segment, wherein the chamfer portion is formed without machining.

In one aspect, the chamfer portion has an outwardly facing concave profile and an inwardly facing convex profile.

In one aspect, the minor diameter and the major diameter include a mirror-like finish.

In one aspect, the component is formed from a blank having a sodium stearate soap coating applied thereto.

In one aspect, the component is formed in a transfer press.

In one aspect, the flange segment, hub segment, and splines are pressed and formed from a common blank.

In one aspect, the inner diameter includes vertically extending witness marks circumferentially aligned with the minor diameter.

According to yet another aspect of the disclosure, a method of manufacturing a torque-transmitting component is provided, the method comprising the steps of: providing a flat blank having a flat profile to a transfer press having a first station, second station, third station, and fourth station, the first, second, third, and fourth stations including a first, second, third, and fourth die and a first, second, third, and fourth punch, respectively; at the first station of the transfer press, pressing the blank between the first die and the first punch and forming an unfinished component having a radial flange segment and an axial hub segment, the unfinished component in the form of a first cup-shaped preform; transferring the first preform to the second station and pressing the first preform between the second die and the second punch and defining a second preform of the unfinished component having a chamfer portion disposed between the flange segment and the hub segment; transferring the second preform to the third station and pressing the second preform between the third die and the third punch and defining a rough splined preform of the unfinished component having a plurality of rough splines extending radially outward from the hub segment; and transferring the rough splined preform to the fourth station and pressing the rough splined preform between the fourth die and the fourth punch and defining a smooth splined component having a final radial flange segment and a final axial hub segment; wherein the smooth splined component includes, along the final axial hub segment, a constant inner diameter, a smooth minor outer diameter, and a smooth major outer diameter.

In one aspect, the first, second, third and fourth punches have decreasing outer diameters.

In one aspect, the pressure applied at the first, second, third, and fourth stations varies.

In one aspect, the third and fourth dies include vertical extending projections sized and arranged to shape the splines.

In one aspect, at the third station, the hub segment is axially elongated in response to the pressing.

In one aspect, the first die and the first punch define a void at a location of a transition from the flange segment to the hub segment.

In one aspect, the second die includes a support portion at the location of the transition to shape the chamfer portion.

In one aspect, the third station includes a counter-pressure sleeve surrounding the third punch, the method further comprising holding the counter-pressure sleeve above the hub segment.

In one aspect, the method includes pushing material of the rough splines into space defined by the fourth die.

In one aspect, no machining operation is performed on the minor diameter of the splines.

In one aspect, the method includes trimming an upper end of the smooth splined component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 12A is a schematic view of the component disposed at a third station;

FIG. 12B is a schematic view of the second pre-form being formed into a rough spline pre-form during the third draw at the third station;

Corresponding reference numerals indicate corresponding parts and/or sub-assemblies throughout the several views of the drawings.

DETAILED DESCRIPTION

Figure 1:
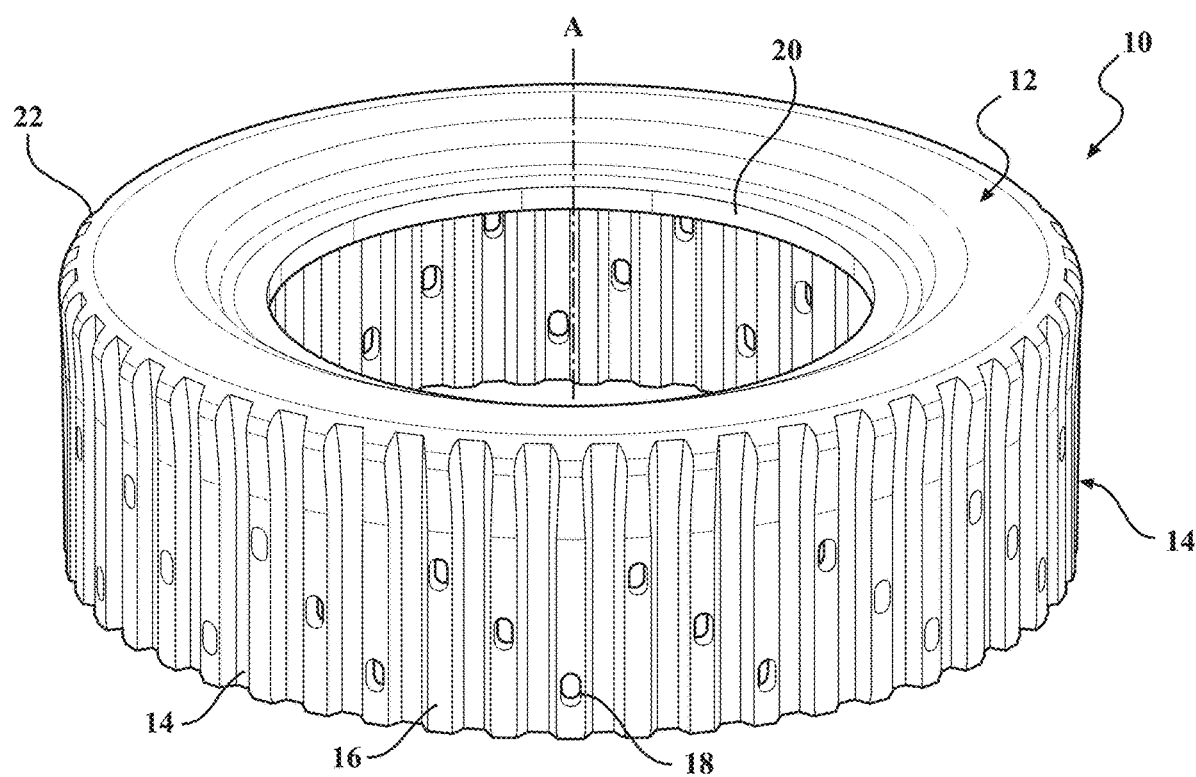
FIG. 1 is an isometric view of a conventional clutch hub of the type used in a multi plate clutch assembly and manufactured from a drawn cup-shaped preform using a Grob spline forming process and which is shown in a "pre-machined" condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In general, the teachings of the present disclosure are directed toward a method of manufacturing an annular component from a blank of steel and which is capable of providing non-machined straight formed splines. The present disclosure further relates to an annular clutch component fabricated using this new part forming process. In one embodiment, the annular component is a clutch hub of a multi-plate friction clutch assembly for use in vehicular drivetrain applications which may include, without limitations, automatic transmissions, transfer cases, power take-off units, torque couplings and disconnect couplings.

Figure 2:
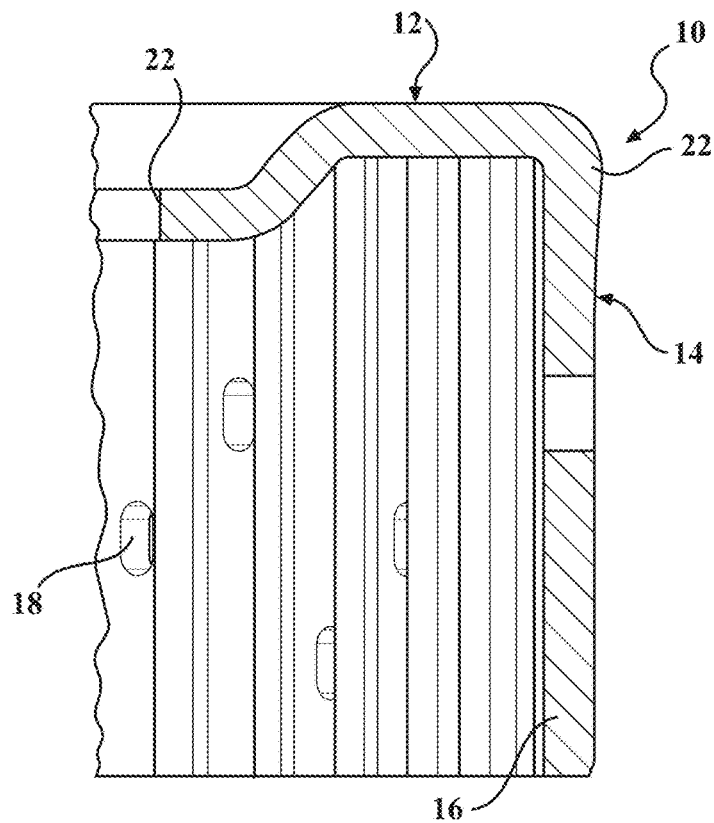
FIG. 2 is a partial sectional view of the clutch hub shown in FIG. 1 showing the Grob spline form in the as-formed pre-machined condition.
Figure 3:
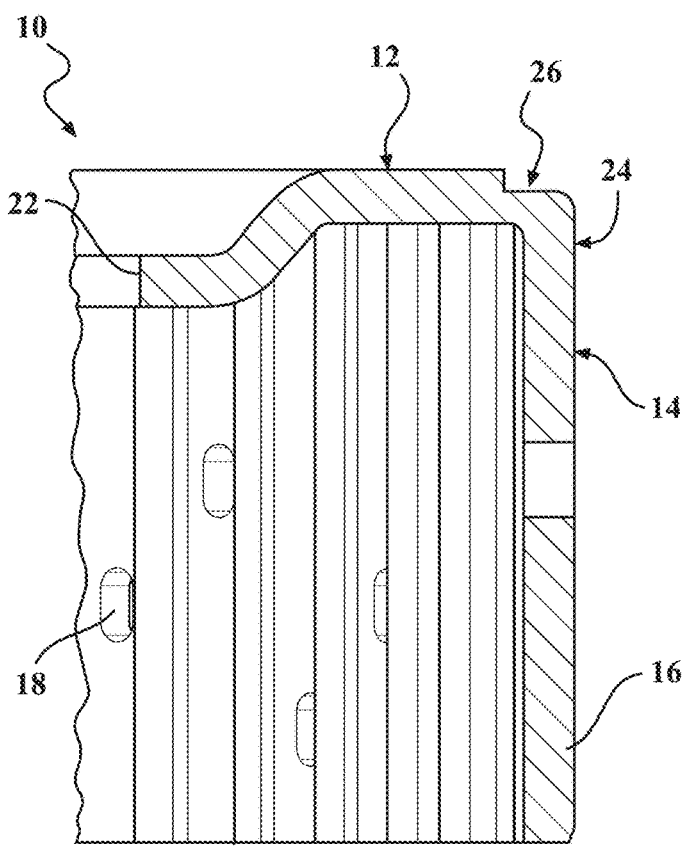
FIG. 3 is a partial sectional view, similar to FIG. 2, showing subsequent metal-cutting machining operations which results in the disadvantages mentioned in the Background section.

FIGS. 1 through 3 illustrate a conventional (prior art) clutch component, hereinafter annular clutch component 10, having a radial plate or flange segment 12 and axial hub segment 14 while together define a cup-shaped member formed by a cold-forming operation. The cup-shaped member is subsequently exposed to a spline forming process, commonly referred to as Grob splining, to form a set of circumferentially-aligned spline forms 16, i.e., "splines", in axial hub segment 14. Subsequently, a trim and slotting operation is conducted to pierce a plurality of oil transfer holes 18 and to properly size an aperture 20 formed in radial flange segment 12. Annular clutch component 10 is shown in FIG. 2 following these initial operations. A known shortcoming of the Grob splining process is located at the outer radius profile at an interface 22 of radial flange segment 12 and axial hub segment 14. This profile requires subsequent machining (i.e. a metal cutting operation) as shown in FIG. 3 to remove material and provided machined straight splines 24 and a machined step 26 for subsequent laser welding of additional drive/driven component. The machining operation for the straight splines 24 is known to result in burrs that must be removed via a deburring operation. The above-noted description is an abbreviated disclosure of a well-known method for manufacturing metal-formed clutch hubs with splines 16 sized and configured to mesh with internal clutch teeth formed on clutch plates of the multi-plate clutch pack. Such "prior art" clutch hubs are satisfactory for their intended purposes. However, the following detailed disclosure of an alternative manufacturing method is intended to eliminate the spline machining and step machining operations, as well as to improve the surface finish of the splines.

Figure 4:
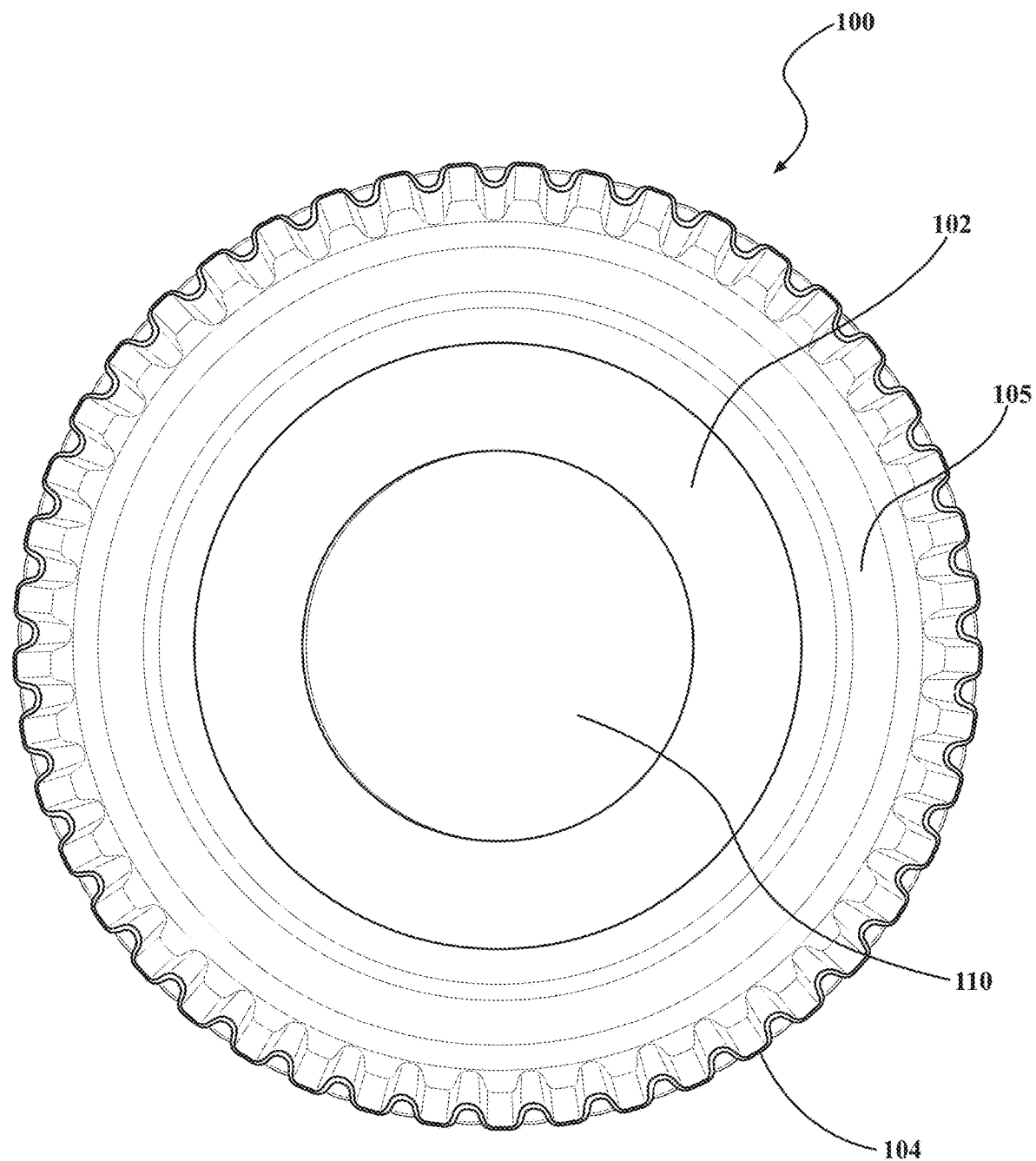
FIG. 4 is a top view of a splined component using a new forming process embodying the teachings of the present disclosure and illustrating a continuous inner diameter.
Figure 5:
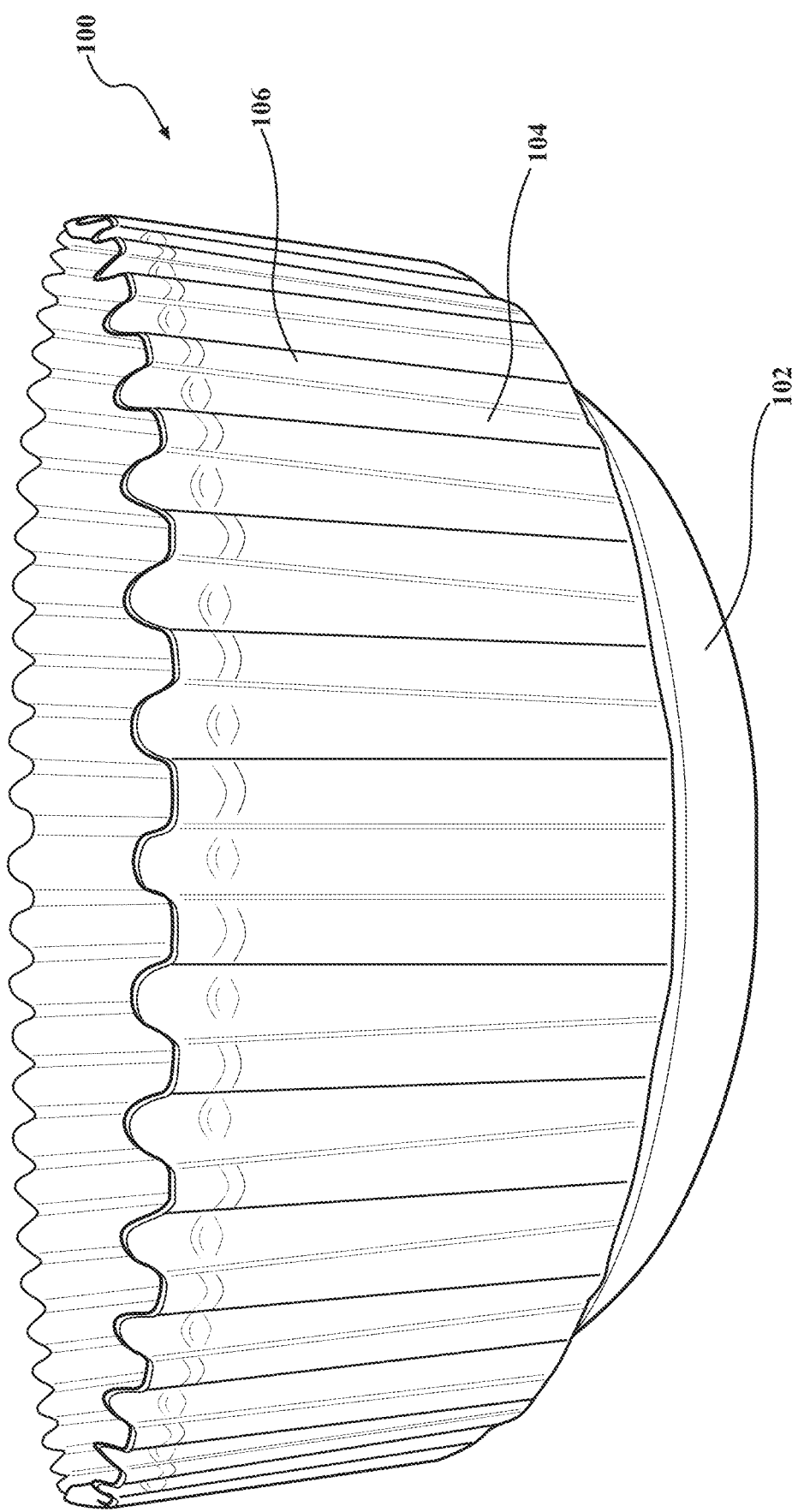
FIG. 5 is a partial perspective view of the component of FIG. 4 illustrating an exterior splined surface with a smooth mirror-like finish.

To this end, FIGS. 4 and 5 illustrate an improved annular component 100 manufactured in accordance with a new method that is disclosed herein. In particular, FIG. 4 shows annular component 100 to include a cup-shaped member that is disposed about a center axis and has a radial flange segment 102 and an axially-extending hub segment 104. The radial flange segment 102 and hub segment meet at an interface 105. The hub segment 104 extends from the interface 105 to an open end that is opposite flange segment 102.

As further described below, a cup-shaped pre-form (formed in a drawing operation) is subsequently exposed to additional pressing and forming operations to form a continuous series of circumferentially-aligned spline forms 106 on hub segment 104. As seen, a central aperture 110 is also provided, and oil transfer holes (not shown, but similar to those shown FIGS. 1-3) may be provided through the hub segment 104. In accordance with the present disclosures, multi-station transfer press 120 (FIG. 6) is used to output a finished part including non-cut straight spline forms 106 (formed via transfer press).

Figure 6:
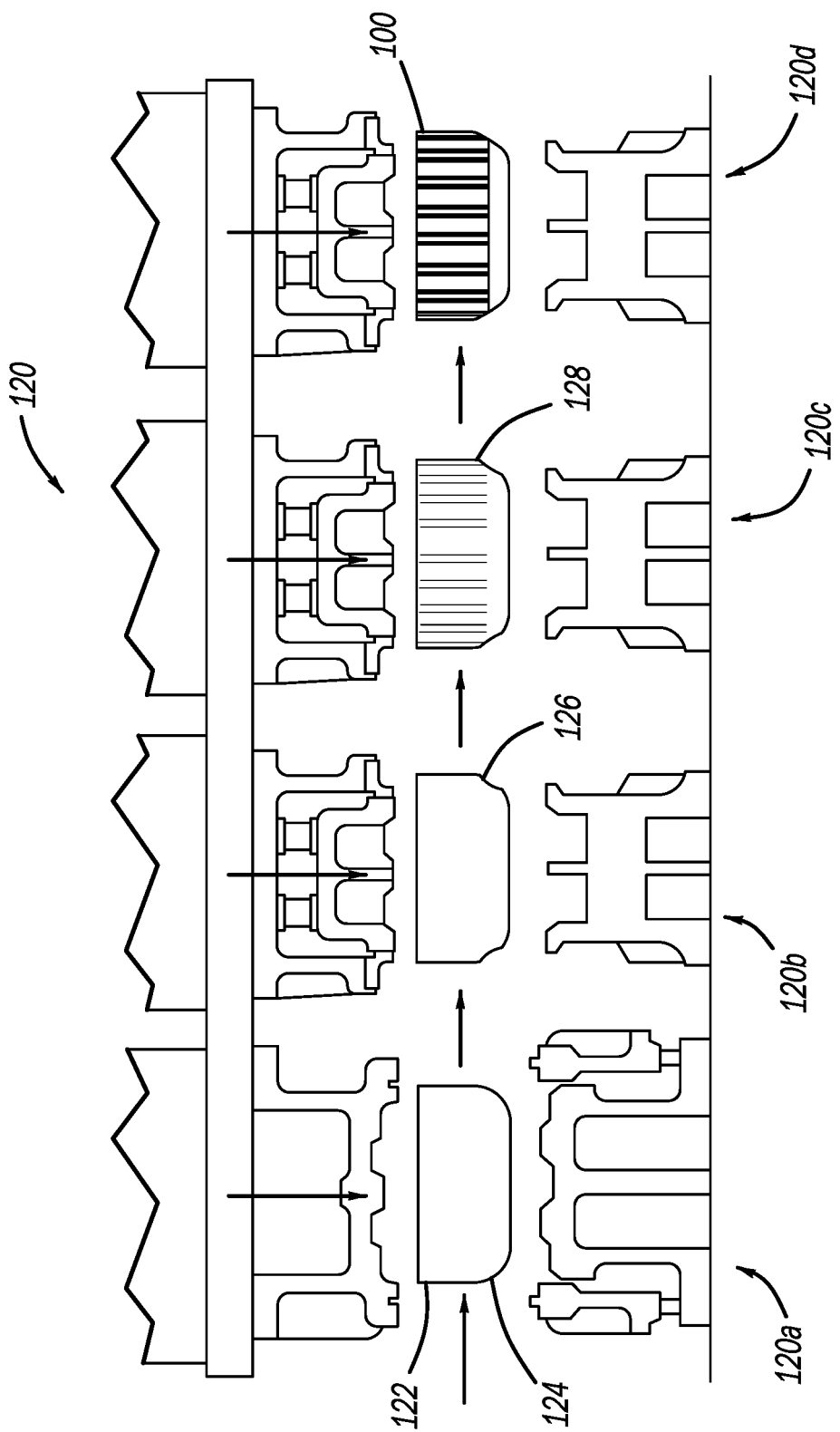
FIG. 6 is a schematic view of transfer press illustrating the component being formed at four stations.

Referring to FIG. 6, transfer press 120 is illustrated, including four stations 120a, 120b, 120c, 120d thereof. Each of the stations may be used to define the final formed shape of the component 100, including the splines 106, prior to any additional finishing operations. Each of the stations will be described in further detail below.

First station 120a may be referred to as cup-forming station. Second station 120b may be referred to as diagonal face forming station. Third station 120c may be referred to as rough spline forming station. Fourth station 120d may be referred to as finish spline forming station. Generally, the component formed following one station is placed into the next station to undergo further forming, and is then removed and transferred to the next station for additional forming.

With reference initially to FIG. 6, transfer press 120 is configured to a receive a flat blank 121 at the first station 120a, wherein a first pressing operation is performed on the blank 121 to begin the defining a first cup-shaped pre-form 124 (having generally radial plate and axial hub portions). The first pre-form 124 is transferred to the second station 120b, where the pre-form 124 undergoes a second pressing operation to define a second pre-form 126 (further defining the plate and hub interface). The second pre-form 126 is then transferred to the third station 120c, where the second pre-form 126 undergoes a third pressing operation to define a first splined pre-form 128 (a rough spline formed on the hub). The first splined pre-form 128 is then transferred to the fourth station 120d, where the first splined pre-form 128 (having the rough spline form) undergoes a fourth pressing operation to further define and shape the splines 106 and define the component 100.

For the purposes of further discussion, the various intermediate shapes created between the initial flat blank 121 and the final shaped and splined component 100 (for example the various shaped and splined pre-forms 124, 126, 128 described above) may be referred to collectively as unfinished component 122 as they are transferred and pressed and formed at various stations 120a-120d. Flat blank 121 may also be referred to generally as unfinished component 122, and the unfinished component 122 at the final stage of the transfer press 120 may still be referred to as the unfinished component 122 (even though it has undergone the final step of the transfer press 120 and will be removed from the transfer press as finished component 100). It will be appreciated that once the pressing and forming changes the shape of the flat blank 121 to one of the intermediate shapes of the unfinished component 122, that the shape of the unfinished component 122 will be different than the initially provided flat blank 121, as it is formed within stations and transferred among stations.

Each of the stations of the transfer press 120 may be actuated at the same time, such that the first, second, third, and fourth pressing operations are performed generally simultaneously to different forms of the unfinished component 122 that are in different stages of the forming process. The cycle time per pressing operation may therefore be reduced, such as 4 seconds. The unfinished component 122, in its various stages of forming, may be automatically transferred between stations between pressing instances by an automatic or robotic transfer mechanism (not shown).

Figure 7A:
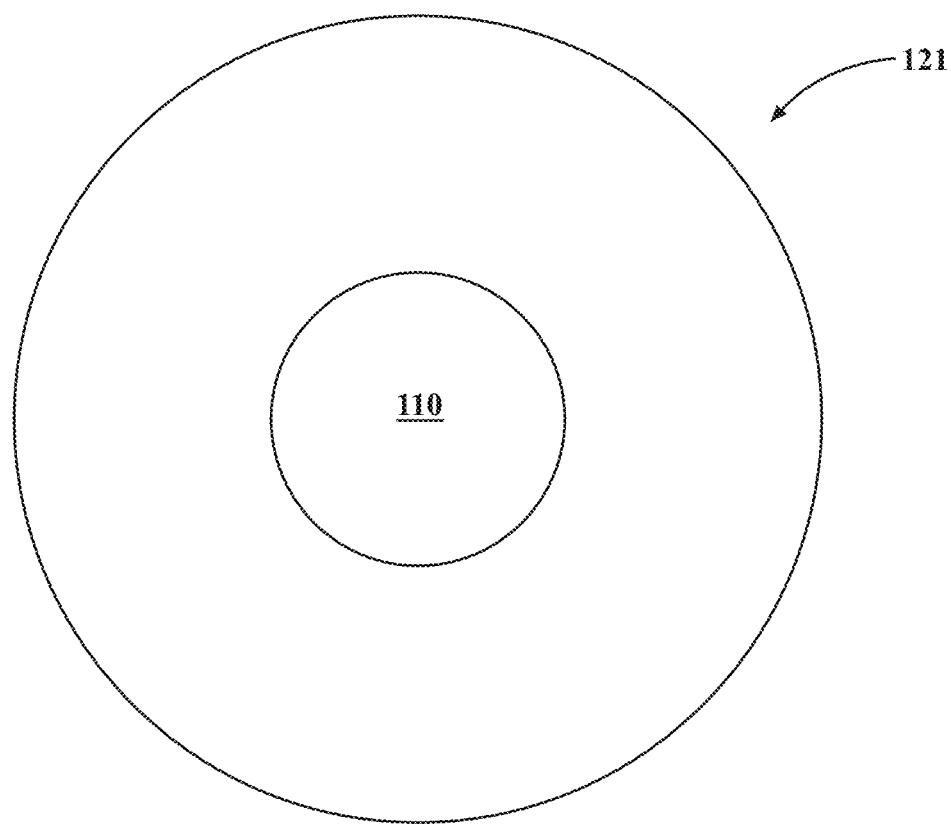
FIGS. 7A and 7B are schematic views of a blank used to form the component.
Figure 7B:
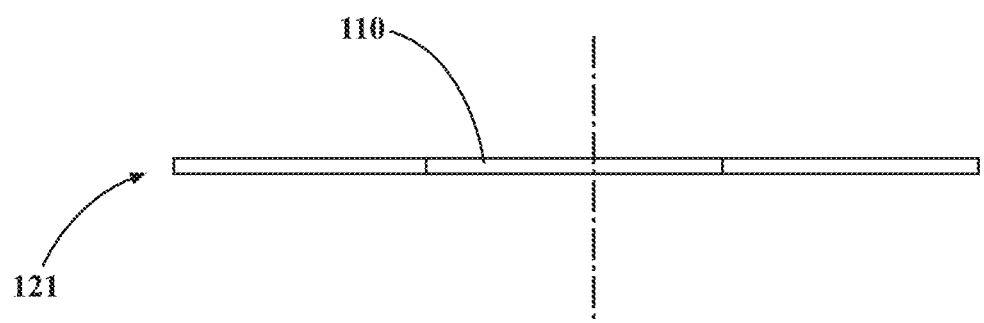

Referring now to FIGS. 7A and 7B, the flat blank 121 is illustrated in its flat form. The blank 121 may have a generally flat profile with a constant thickness. The blank 121 may be made from high strength steel, in one aspect. However, it will be appreciated that other materials may also be used, such as aluminum, depending on the material requirements of the particular type of component 100 being formed. The blank 121 may include central aperture 110, such that the blank 121 has an annular shape. Various dimensions of the blank 121 may be used depending on the final shape and size of the particular component 100. For purposes of discussion herein, specific dimensions may be described and/or illustrated in the figures for illustrative and discussion purposes. It will be appreciated that other dimensions could also be used. In one aspect, the blank 121 may have a diameter of about 230 mm, with aperture 110 having a diameter of about 90 mm. The thickness of the blank 121 in this example may be about 3.6 mm. The blank 121 may therefore be described, in this example, as a thin circular shaped disc with a hole located in the center of the blank 121.

In one aspect, the blank 121 may include a coating on both sides of the disc-shape. The coating may be applied via salt bath, and may be used to assist in reducing heat during the forming operation described herein. In one aspect, the active ingredient in the coating may be sodium stearate soap.

The thickness of the blank 121 may be chosen based on a variety of factors, including desired amount of material movement, in particular the movement that occurs during the forming of the splines 106 on the outer diameter of the component 100. During the spline-forming processes, material will be pushed, formed, and will move from a thick area into a spline region with a larger volume. Put another way, material may be pushed or pulled into open-spaces defined by the tooling to form the splines 106. Thus, material of the unfinished component 122, in the spline forming process, is generally not removed from the unfinished component 122, but rather is re-allocated to define the major and minor diameters of the exterior surface to form the rough and subsequently finished spline forms.

The flat blank 121 is introduced into the transfer press 120 and transferred between stations 120a-d, as described above, after undergoing processing into the various shapes of the unfinished component 122. Each transfer station 120a-d will now be described in further detail.

Figure 8:
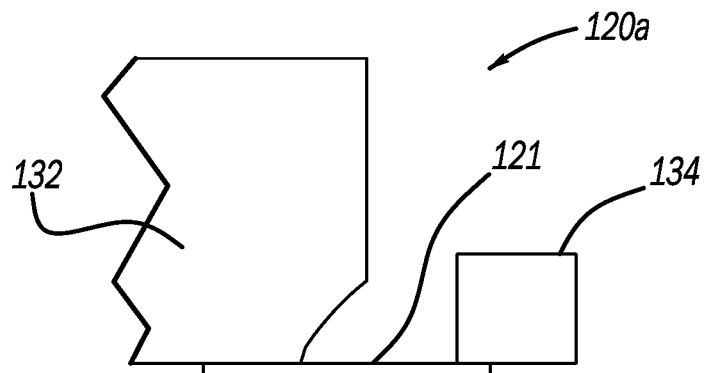
FIG. 8 is a schematic view of the blank disposed at a first station of the transfer press prior to a first draw.

Referring to FIG. 8, the flat blank 121 is shown positioned within the first station 120a, prior to performing the first pressing operation, also referred to as the first draw. The first station 120a includes a first die 130 and a first punch 132. Indeed, each of the stations includes a die and a punch, which may be actuated in a traditional transfer press operation, unless otherwise noted. The punches are disposed above the dies. Accordingly, relative orientations, such as above and below will be used herein to described various positioning of the various components. However, it will be appreciated that different orientations could also be used. For example, a punch could be placed below a die. In another aspect, the punch and die could be arranged to travel horizontally or at an oblique angle relative to horizontal/vertical.

FIGS. 8-12B and 13A-13B illustrate cross-sectional views of the dies and punches of the various stations 120a-d, The first die 130 may support the blank 121, which may be placed above the die 130. In one aspect, the first die 130 may define an outer portion 130a having an inner diameter defining a die cavity 130c defined radially within the outer portion 130a. In one aspect, the first die 130 may also include a lower portion (not shown) disposed below the cavity 130c, which may combine with outer portion 130a to define a cup-shaped profile. However, in one aspect, during an initial pressing/forming operation, a lowermost surface of the flat blank 121 may not make contact with such a lower portion, and therefore the lower portion may be excluded. Subsequent forming operations at subsequent stations may be used to define the radially extending plate portion of the component.

The first die 130 (and the other dies described herein) are illustrated cross-sectionally as generally one half of a rotationally symmetrical shape. It will be appreciated that a similar arrangement is disposed on the opposite side of a central axis. As illustrated in FIG. 8, the central hole/opening of the flat blank 121 is shown on the left side of the figure under the punch 132.

In one aspect, a retention ring 134, having an annular shape, may be placed above the flat blank 121 when the blank 121 is supported on the die 130. More particularly, the retention ring 134 may sandwich the blank 121 against the outer portion 130a of the die 130, and the blank 121 may extend over the die cavity 130c.

Figure 9:
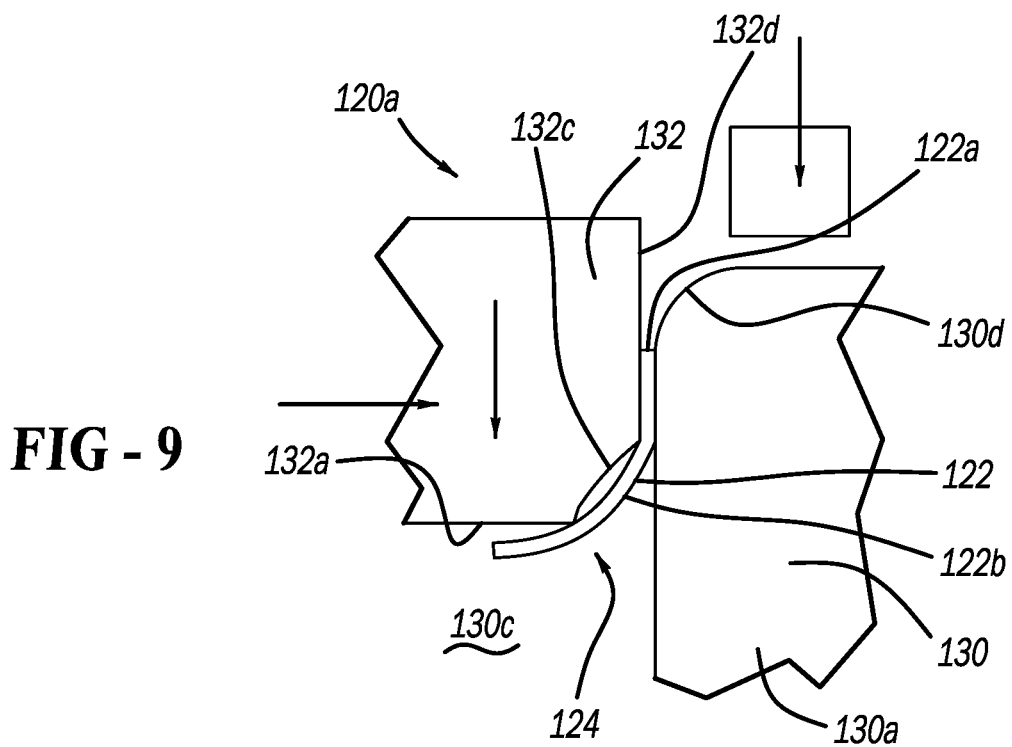
FIG. 9 is a schematic view of the blank being formed into a cup-shaped pre-form during the first draw at the first station.

With the blank 121 supported on the die 130 and the retention ring 134 disposed on the blank 121, the blank 121 may undergo the first draw, as illustrated in FIG. 9, thereby transitioning the flat blank 121 to the unfinished component 122. The unfinished component 122 will undergo multiple subsequent operations to further refine its shape until it is in finished form, in particular by forming the splines 106. It will be appreciated that the unfinished component 122 is the same piece that was previously described as the flat blank 121, but having a different shape.

FIG. 9 shows the unfinished component 122 formed into a cup-shaped first pre-form 124 during the first draw. The first punch 132 moves toward the first die 130 into the position shown in FIG. 9. As the first punch 132 moves downward relative to the first die 130, the flat blank 121 is forced downward into the die cavity 130c to create the first pre-form 124 of the unfinished component 122. The outer portion 130a of the die 130 may include a radiused inner edge 130d. As the flat blank 121 is pressed downward into the cavity 130c, the flat blank 121 will slide inward along the top of the outer portion 130a, and will slide along the radiused edged 130d and drop into the cavity 130c, forming the first pre-form of the unfinished component 122. The unfinished component 122 in this position has an outer edge 122a that is disposed below the top of the outer portion 130a of the die 130. In one aspect, the retainer ring 134 may be lifted during the first draw to allow the material to more easily slide inward. In another aspect, the retainer ring 134 may be removed or excluded.

The first punch 132 is sized to be received within the die cavity 130c, and may include a bottom face 132a and an outer diameter. A chamfer 132c may be defined at the intersection of the bottom face 132a and the outer diameter. The chamfer 132c may be radiused at its intersection with the outer diameter and may also be radiused at the intersection between the chamfer 132c and the bottom face 132a.

When the punch 132 is pressed into the die 130, the blank 121 will be drawn in and bend around the general shape of the punch 132. The chamfer 132c permits the component 122 to be formed to include a radiused edge 122b. The radiused edge 122b of the component 122 does not exactly match the shape of the chamfer 132c, and open space or void may be disposed between the punch 132 and the component 122 at the area of the chamfer 132c.

In one aspect, the chamfer 132c may have a concave cross-sectional profile, rather than a constant slope. In either case, as the material of the unfinished component 122 bends around the chamfer 132c, space may be defined between the curved shape of radiused edge 122b and the surface of the chamfer 132c.

Additionally, the die 130 may define a void or space between the component 122 and the die 130 at the area of the chamfer 132c. The radiused edge 122b of the unfinished component 122 can be further shaped and processed in subsequent pressing processes, such as at station 120b. Because the chamfer 132c and die 130 both define voids relative to the unfinished component 122, the actual shape and curvature of the unfinished component 122 may vary during this step for each part, with more predictable curvatures and shapes being defined in subsequent steps performed on the unfinished component 122.

It will be appreciated that the punch 132 may also have different shapes (in addition to or alternative from the chamfer 132c) to define various shapes features along the bottom face 132a and outer diameter.

During the first draw shown in FIG. 9, the punch 132 may be actuated with about 30 tons of force. The first draw requires a relative low amount of pressure because the flat blank 121 is not being formed to its final shape. Rather, the blank 121 is being formed into its cup shaped first pre-form 124 of the unfinished component 122. In one aspect, the die 130 may include a gas assist that applies an upward force toward the punch 132 to provide a reaction force on the punch 132. Gas assist may be used at other stations of the transfer press 120, as well.

With the component 122 shaped into pre-form 124 as shown in FIG. 9, the punch 132 and die 130 may separate, and the component 122 may be removed and transferred to the second station 120b.

Figure 10:
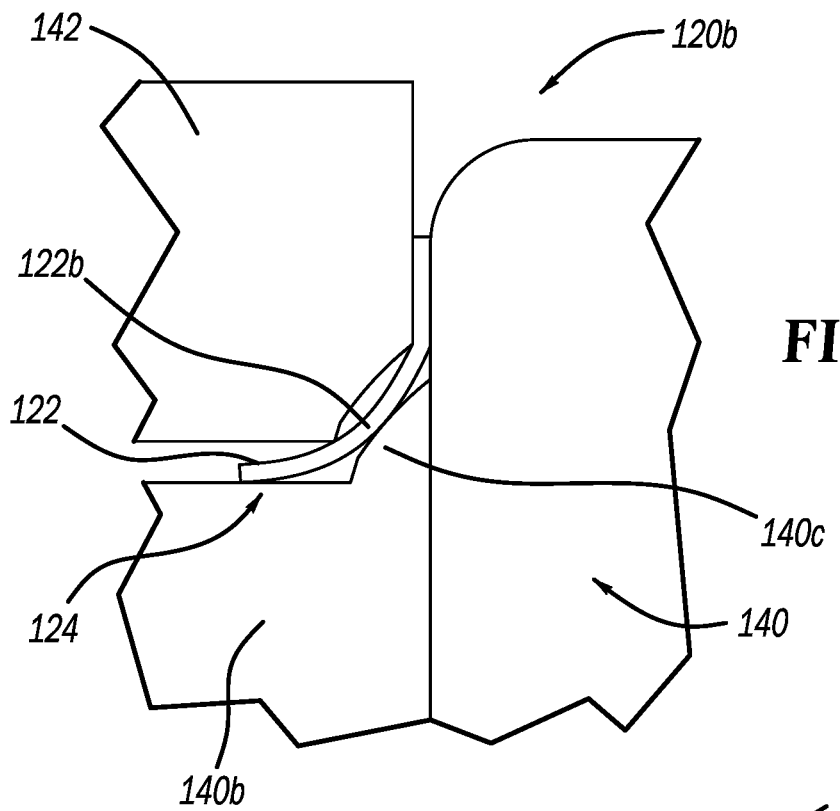
FIG. 10 is a schematic view of the cup-shaped pre-form disposed at a second station of the transfer press prior to a second draw
Figure 11:
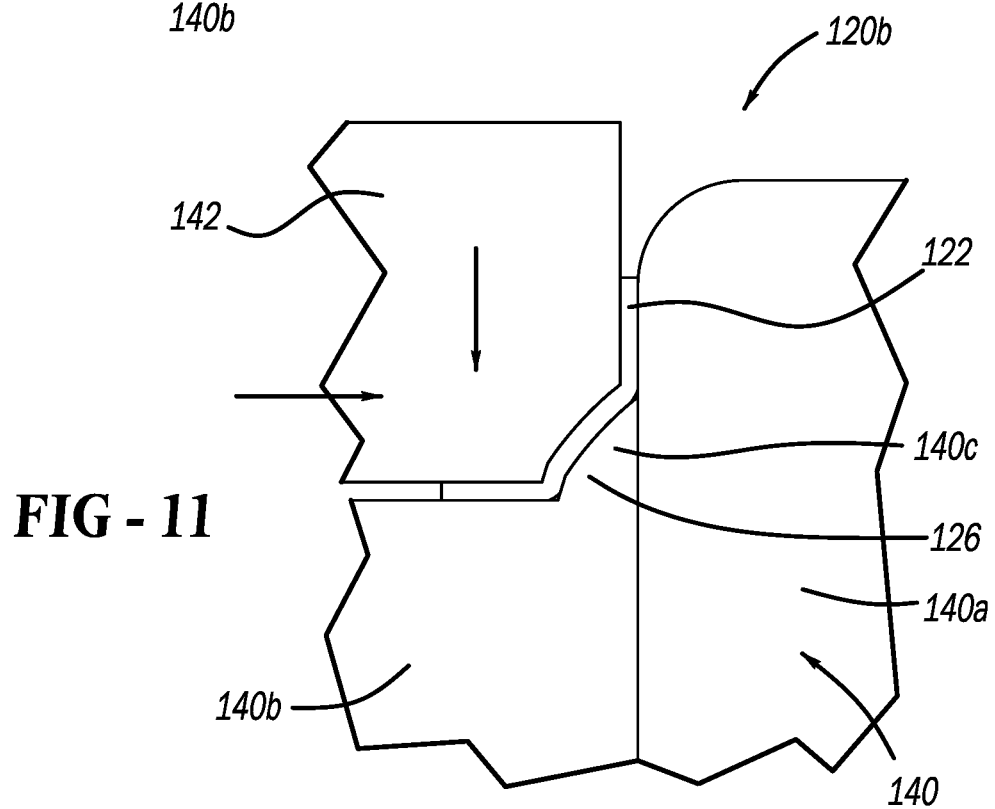
FIG. 11 is a schematic view of the pre-form being formed into a second pre-form during the second draw at the second station.

Referring now to FIGS. 10 and 11, the component 122 is shown being shaped in the second station 120b during a second pressing operation, or second draw. The second station includes a second die 140 and a second punch 142. The shape of the second die 140 and the second punch 142 may be generally similar to the first die 130 and first punch 132. However, the following differences provide further shaping of the component 122.

The second die 140 may include a support portion 140c disposed at the inner corner between an outer portion 140a and a lower portion 140b. The support portion 140c is in contrast to the void described above. The support portion 140c is shaped to define the radiused edge 122b of component 122 into a different shape corresponding to the shape of the support portion 140c. The punch 142 includes a corner shape corresponding to the shape of the support portion 140c.

As shown in FIG. 10, the support portion 140c may have a generally convex shape, and the punch 142 may include a generally concave shape. As shown in FIG. 10, the punch 142 is not yet fully pressed into engagement with the die 140, and the component 122 still has a generally curved edge of the first pre-form 124.

FIG. 11 illustrates the corner of the component 122 being formed in a shape corresponding to the shape of the support portion 140c and the punch 142. In FIG. 11, the punch 142 is pressed down into engagement with the die 140. The shape at this corner of the component 122 may be application specific depending on the design needs of the final component, and is generally unrelated to the design needs of the spline formation. As shown in FIG. 11, the voids on either side of the corner of the unfinished component 122 are eliminated and the corner takes the shape of the punch 142 and die 140 at the location of the support portion 140c.

The second die 140 may include an inner diameter defined by the outer portion 140a that is slightly smaller than the inner diameter defined by the outer portion 130a of the first die 130. The second punch 142 may have a slightly smaller diameter than the first punch 132. The reduction in diameter from the punch/die relative to the first station 120a functions to allow for rougher shape to be defined in the first station 120a and then further refined and defined in the second station 120b. The smaller diameter of the punch 142 also allows for the punch to be more easily received in the first pre-form 124.

Prior to translating the punch 142 and the die 140 together to the position shown in FIG. 11, the component 122, in its cup shaped first pre-form 124, may be placed above the upper surface of the second die 140. The second punch 142 will fit inside the inner diameter of the cup shape of the unfinished component 122. The pressing operation of the second draw (shown in FIG. 11) will effectively define the final shape of the component 100, absent the splines. However, the inner diameter may ultimately become slightly smaller during the spline formation processes. Additionally, the chamfer area of the component 122 may be further modified in its shape, if desired, by including different die shapes. During the second draw, 510 tons of force may be applied by the second punch 142. The force applied at the second station 120b during this draw is substantially higher than at the first station 120a, because the geometry of unfinished component 122 is being more precisely defined.

Following the second draw at the second station 120b, the unfinished component 122 with its second pre-formed shape 126 may be removed from the second station 120b and transferred to the third station 120c.

Figure 12C:
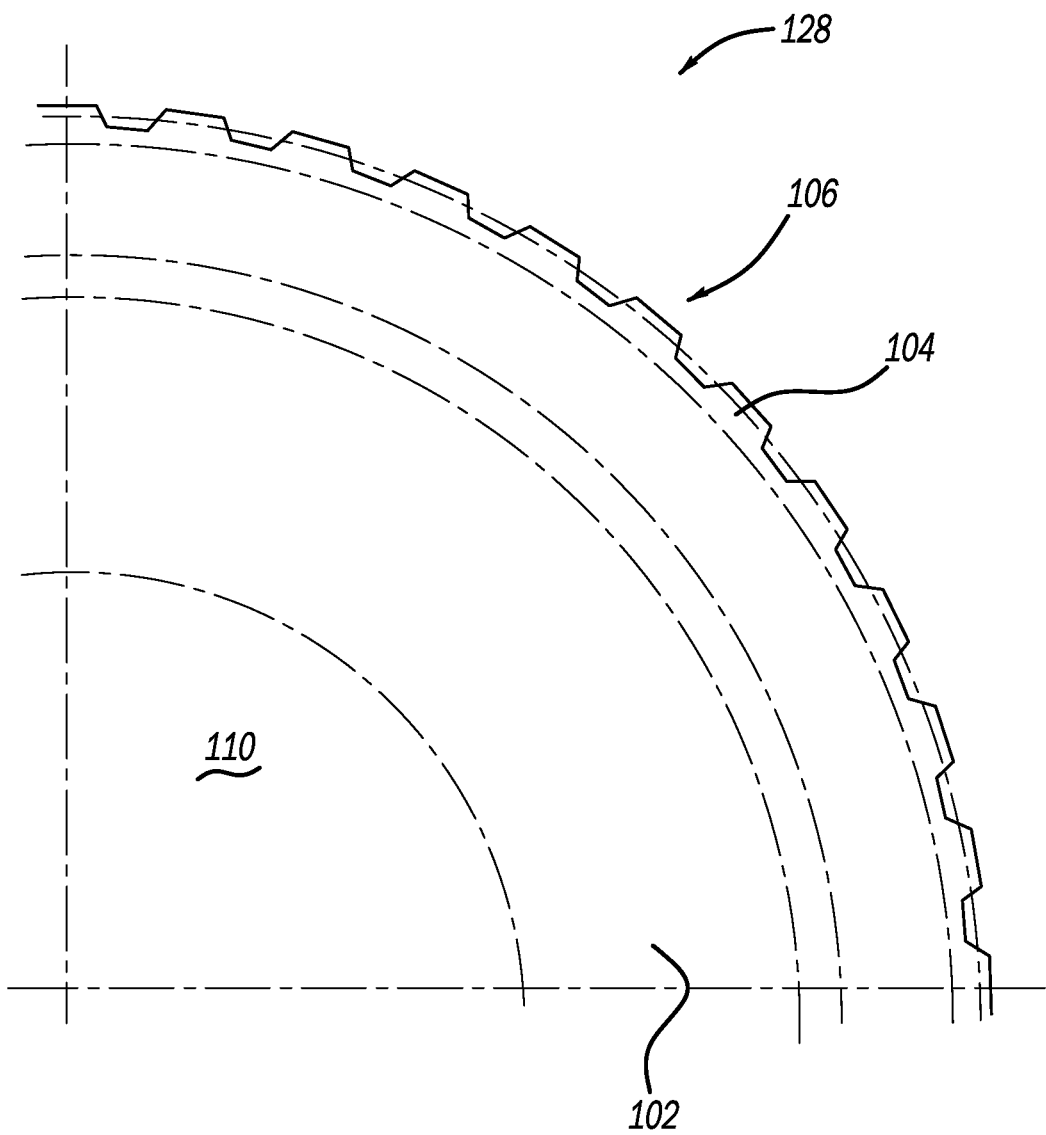
FIG. 12C is a partial top view of the rough spline pre-form.

Referring to FIGS. 12A-12C, the third station 120c is illustrated, with the component 122 being formed to include a rough form of the splines 106 on an outer surface of the unfinished component 122. The third station 120c includes a third punch 152 and a third die 150.

An outer portion 150a of the die 150 may define a negative shape relative to the desired shape of the splines 106 for the final formed component 100. Put another way, the die 150 may include a plurality of vertical extending projections 150f that correspond to the shape of the indentations of the desired splines 106. Each of the projections 150f may extend radially inward from the outer portion 150a of the die. The projections 150f may include a lead-in feature 150g at an uppermost end of the projection 150f.

Prior to actuating the punch 152 and/or die 150, an injector (not shown) may hold the component 122 above the position of the die 150 prior to the pressing operation.

During the pressing operation, the punch 152 may apply about 140 tons of pressure. During the pressing operation, the die 150 will push/pull material of the component 122 upward along the outer portion 150a of the die 150, extending the axial length of the component 122 in the area of the splines 106. The pull of material of the component 122 will further cause the material to press against the outer diameter of the punch 152, which will operate to define the inner diameter of the component 122. In one example, the top of the unfinished component 122 is about 63.9 mm above the bottom-most surface of the unfinished component. In the prior pressing step, the top of the component 122 was about 46.9 mm from the bottom-most surface of the component 122. The inner diameter of the punch 152 is slightly smaller than the inner diameter of the second punch 142, thereby allowing the third punch 152 to fit within the unfinished component 122, and allowing material to be formed and pressed against the slightly smaller diameter of the third punch 152 during the pressing operation.

FIGS. 12A and 12B illustrates the punch 152 and die 150 in two positions, with FIG. 12A showing the punch 152 and die 150 prior to a pressing operation, and FIG. 12B showing the die 150 moved upward relative to the punch 152, thereby forming the rough form of the splines 106. The inner diameter 122 of the component is generally constant, defined by the diameter of the punch 152.

In one aspect, shown in FIGS. 12A and 12B, a counter-pressure sleeve 153 is disposed above the component 122 and surrounding the punch 152. The counter-pressure sleeve 153 may be fixed in place relative to the punch 152, and when the punch 152 moves downward relative to the die 150, the counter-pressure sleeve will operate to brace the unfinished component 122 as the splines are formed by the relative upward movement of the die 150.

In another aspect, the counter-pressure sleeve 153 may be excluded, and the punch 152 may provide the counter-pressure.

Following the pressing operation of the third station 120c of FIG. 12, the component 122 includes a rough forming of the external splines 106 thereon, and the annular wall of the component 122 has an extended axial length caused by the pull and forming of material caused by the vertical projections impacting the component 122. The component 122, shaped as the first splined pre-form 128, having the rough form of the splines 106 thereon, can subsequently be removed and transferred from the third station 120c to the fourth station 120d. FIG. 12C illustrates a top view of the first splined pre-form 128 illustrating the constant inner diameter and the rough form of the splines 106.

Figure 13A:
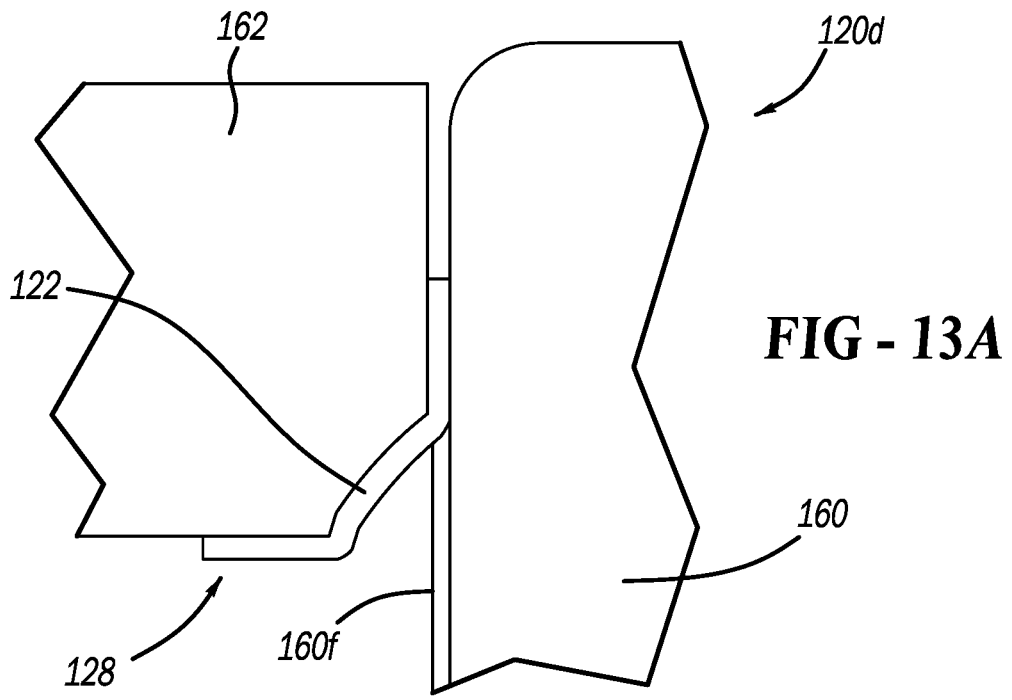
FIG. 13A is a schematic view of the rough spine pre-form at a forth station.
Figure 13B:
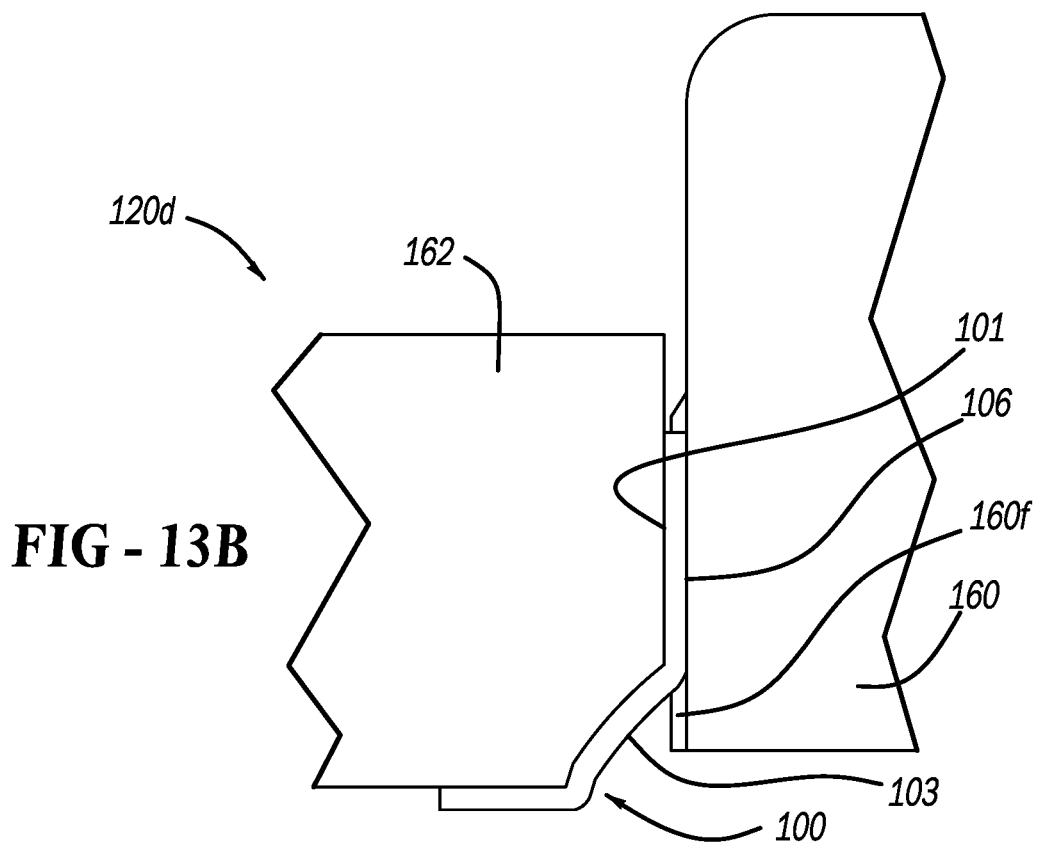
FIG. 13B is a schematic view of the rough spline pre-form being formed into a final smooth splined component during a fourth draw at the fourth station.
Figure 13C:
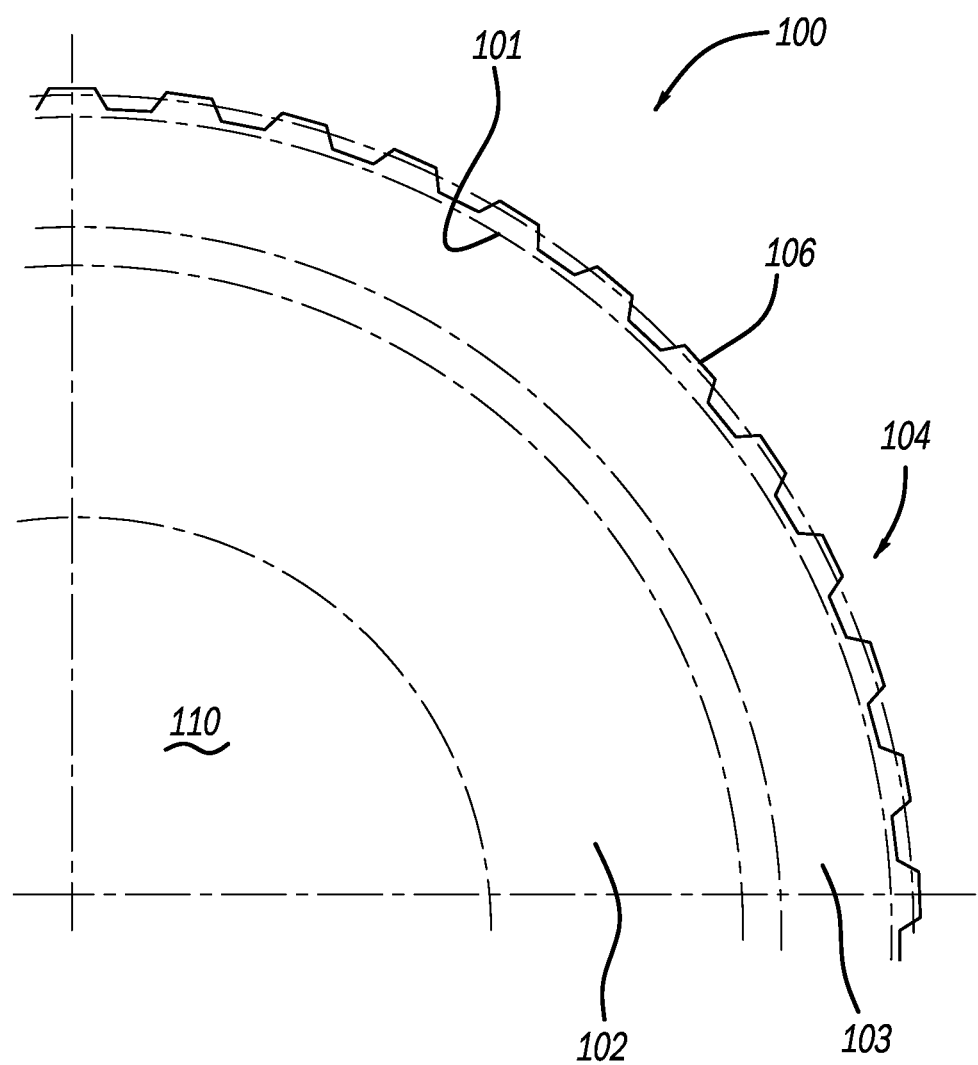
FIG. 13C is a partial top view of the final smooth splined component.

FIGS. 13A-13C illustrates a further spline-forming pressing operation, in which the rough form of the splines 106 are formed into a final smooth form. It will be appreciated that the reference to the final form refers to the last station 120d of the disclosed transfer press 120 process, but that additional processing may still be performed.

Similar to the prior stations, the component 122 is positioned above or at the upper opening of a fourth die 160, with a fourth punch 162 configured to be inserted into the component 122 and to press the blank 122 into the fourth die 160. The outer shape of the fourth punch 162 mimics the final inner shape of the component 100. Similarly, the shape of the fourth die 160 mimics the final outer shape of the component 100. The cooperating shapes of the fourth die 160 and the fourth punch 162 are arranged to form the material of the unfinished component 122 into the form of the final component 100, and the corresponding shapes of the fourth die 160 and the fourth punch 162 will define a smooth continuous inner diameter 101 of the component, a chamfered edge 103, and the outer spline profile 106 of the component 100. The fourth station 120d may also be referred to as the finish spline forming station.

Prior to the pressing operation, as shown in FIG. 13A, the rough form of the splines 106 are aligned with vertical extending projections 160f formed on the outer portion of the fourth die 160, such that the projections 160f are aligned with the vertical recesses present on the rough form of the splines 106 of pre-form 128. Similarly, the radially outwardly projecting rough spline forms of the component 122 are aligned with the recesses between the vertically extending projections 160f.

The fourth punch 162 may be applied with about 95 tons of pressure. This amount of pressure is lower than the third station 120c, because the rough form of the splines 106 has already occurred. The diameter of the punch 162 is slightly smaller than the diameter of the third punch 152, and defines the smooth continuous inner diameter 101 of the component 100

At the conclusion of the pressing operation of the fourth station 120d, shown in FIG. 13B, the unfinished component 122 is in the form of the finished component 100 and may be removed. In this form, the unfinished component 122 may be referred to as the component 100 or finished component 100 due to the forming operation being complete, such that the inner diameter 101, chamfer area 103, and external spline geometry 106 is in its final formed condition. FIG. 13C illustrates a top view of finished component 100, including the inner diameter 101 and the splines 106.

However, additional processing on the component 100 may still be performed. For example, the component 100 may be trimmed via a trimming operation at the upper end where the material of the component 100 had been pushed/pulled during the spline forming steps. However, no further machining of the spline 106 is necessary. Additionally, the smooth and continuous inner diameter 101 of the component 100 provides for a component where no additional machining is necessary on the inside profile of the component 100. Put another way, generally no material needs to be removed or machined away in the radial direction of the component to define the spline profile or the inner or outer diameters of the component.

Thus, the resulting component 100 includes the smooth and continuous inner diameter 101. The external splines 106 further exhibit a smooth and shiny/mirror-like appearance. This appearance is different than the result of a broaching or one-shot process. In particular, the surface finish in the root of the spline 106 and on the outer surface of the spline 106 is mirror-like and very smooth, as shown in FIG. 5, while other processes produce witness marks in the direction of forming (along the length of the spline) and exhibit a rougher finish. In the component 100, witness marks may be present inside the cup-form of the component 100 in the corner as a result of the contact of the material with the punches of the transfer press 120. Thus, both the major and minor outer diameters of the component 100 and the splines 106 thereof are smooth and mirror-like. As shown in FIGS. 4 and 5, the inner diameter 101 includes vertically extending witness marks circumferentially aligned with the minor diameter of the splines 106.

The improved surface finish of the splines 106 can improve performance with mating components, in particular sliding contact between the surfaces of the mating component and the splines 106 of the component 100 may be improved.

The above-described process and resulting component 100 provides various advantages. For example, the cycle time of the process is reduced. The manufacturing cost is reduced as a result of the reduced cycle time and reduction of machining operations on the spline. Additionally, the surface finish, as described above, is improved compared to, for example, the broaching process.

Figure 14A:
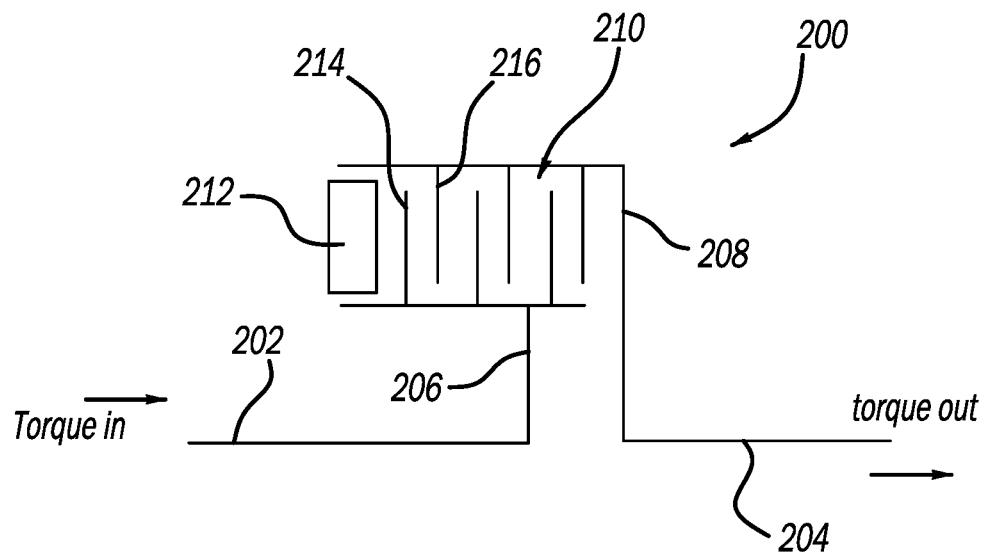
FIGS. 14A and 14B are schematic views of a clutch assembly equipped with one or more annular components manufactured in accordance with the teachings of the present disclosure.

Referring to FIG. 14A, a rudimentary schematic illustration of a multi-plate friction clutch assembly 200 is shown disposed between a rotary input component 202 and a rotary output component 204. Clutch assembly 200 includes a clutch hub 206 driven by input component 202, a clutch drum 208 driving output component 204, a clutch pack 210, and a power-operated clutch actuator 212. In one aspect, the component 100 may be formed as the clutch hub 206. Clutch pack 210 includes inner clutch plates 214 coupled via splines to clutch hub 206 and outer clutch plates 216 coupled via splines to clutch drum 208. Clutch actuator 212 applies an engagement force to clutch pack 210 to transfer drive torque from input component 202 to output component 204. It is contemplated that at least clutch hub 206 (and possibly clutch drum 208) is manufactured using the method of the present disclosure.

Figure 14B:
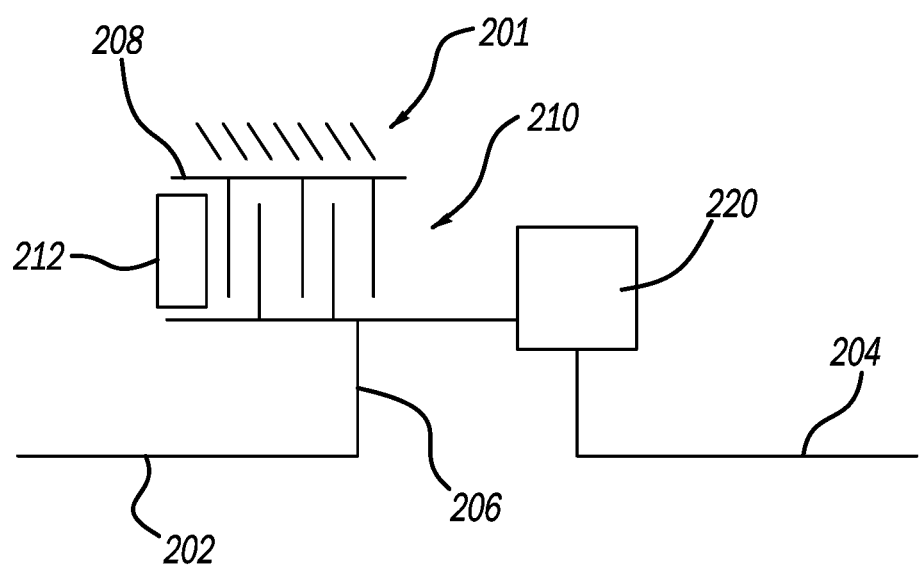

FIG. 14B is a rudimentary schematic illustration of friction clutch assembly 200 being used as a power-operated brake device, possibly as part of an automatic transmission. As shown, clutch drum 208 is now a stationary member, while clutch hub 206 is coupled to a component of a planetary gearset 220. As is known, released and braked operation of friction clutch 200 functions to provide a pair of speed ratio outputs to output component 204 through planetary gearset 220.

The purpose of illustrating these potential uses of the components 100 of the present disclosure is to permit those skilled in the art to appreciate that these components 100 may be adapted for a plethora of automotive and non-automotive torque transmission applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a torque-transmitting component, the method comprising the steps of:
providing a flat annular blank having a flat profile to a transfer press having a first station, second station, third station, and fourth station, the first, second, third, and fourth stations including a first, second, third, and fourth die and a first, second, third, and fourth punch, respectively;
at the first station of the transfer press, drawing the blank between the first die and the first punch and forming an unfinished component having a radial flange segment and an axial hub segment, the unfinished component being in the form of a first cup-shaped preform;
transferring the first preform to the second station and pressing the first preform between the second die and the second punch and defining a second preform of the unfinished component having a chamfer portion disposed between the flange segment and the hub segment;

transferring the second preform to the third station and pressing the second preform between the third die and the third punch and defining a rough splined preform of the unfinished component having a plurality of rough splines extending radially outward from the hub segment; and transferring the rough splined preform to the fourth station and pressing the rough splined preform between the fourth die and the fourth punch and defining a smooth splined component having a final radial flange segment and a final axial hub segment;

wherein the smooth splined component includes, along the final axial hub segment, a constant inner diameter, a smooth minor outer diameter, and a smooth major outer diameter.

2. The method of claim 1, wherein each of the first, second, third and fourth punches have decreasing outer diameters.

3. The method of claim 1, wherein the pressure applied at the first, second, third, and fourth stations varies relative to each other.

4. The method of claim 1, wherein the third and fourth dies include vertical extending projections sized and arranged to shape the splines.

5. The method of claim 1, wherein, at the third station, the hub segment is axially elongated in response to the pressing.

6. The method of claim 1, wherein the first die and the first punch define a void at a location of a transition from the flange segment to the hub segment.

7. The method of claim 6, wherein the second die includes a support portion at the location of the transition to shape the chamfer portion.

8. The method of claim 1, wherein the third station includes a counter-pressure sleeve surrounding the third punch, the method further comprising holding the counter-pressure sleeve above the hub segment.

9. The method of claim 1, further comprising pushing material of the rough splines into space defined by the fourth die.

10. The method of claim 1, wherein no machining operation is performed on the minor diameter of the splines.

11. The method of claim 10, further comprising trimming an upper end of the smooth splined component.

* * * * *